(12) United States Patent  
Seo (10) Patent No.: US 10,794,230 B2  
(45) Date of Patent: Oct. 6, 2020

(54) WASTE HEAT RECOVERY SYSTEM

(71) Applicants: HYUNDAI MOTOR COMPANY, Seoul (KR); KIA MOTORS CORPORATION, Seoul (KR)

(72) Inventor: Jung Min Seo, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 99 days.

(21) Appl. No.: 15/955,971

(22) Filed: Apr. 18, 2018

(65) Prior Publication Data

US 2018/0238197 A1 Aug. 23, 2018

Related U.S. Application Data

(62) Division of application No. 14/954,340, filed on Nov. 30, 2015, now Pat. No. 10,006,316.

(30) Foreign Application Priority Data

Jul. 13, 2015 (KR) .................. 10-2015-0099299

(51) Int. Cl.
  *F01K 23/10* (2006.01)
  *F01N 5/02* (2006.01)
  *F01K 23/06* (2006.01)

(52) U.S. Cl.
  CPC .......... *F01K 23/101* (2013.01); *F01K 23/065* (2013.01); *F01N 5/02* (2013.01); *Y02T 10/16* (2013.01); *Y02T 10/166* (2013.01)

(58) Field of Classification Search
  CPC ............. F01K 5/02; F01K 23/101; F01N 5/02
  See application file for complete search history.

(56) References Cited

U.S. PATENT DOCUMENTS

| 8,919,123 B2 | 12/2014 | Gibble et al. |
| 9,021,808 B2 | 5/2015 | Nelson et al. |
| 9,765,652 B2 * | 9/2017 | Hashimoto ............. F01K 25/08 |

(Continued)

FOREIGN PATENT DOCUMENTS

| CN | 104995478 A | 10/2015 |
| JP | S61-215409 A | 9/1986 |

(Continued)

OTHER PUBLICATIONS

Office Action issued in corresponding Chinese Application No. 201510895597.5 dated Oct. 26, 2018, with English translation.

(Continued)

*Primary Examiner* — Binh Q Tran (74) *Attorney, Agent, or Firm* — Brinks Gilson & Lione (57) ABSTRACT

A waste heat recovery system has a Rankine cycle in which boilers, an expander, a condenser, and a circulation pump are installed on a circulation path in which working fluid is circulated, and the boilers are connected in series with and in parallel to the circulation path. The waste heat recovery system includes: a first and a second direction control valves installed at a top and at a bottom of the boilers to shift flow directions of the working fluid to the boilers; and a controlling unit to receive information of a vehicle and information of the waste heat recovery system to control the first and second direction control valves.

3 Claims, 9 Drawing Sheets

(56) References Cited

U.S. PATENT DOCUMENTS

| | | | |
|---|---|---|---|
| 2011/0308253 A1 | 12/2011 | Ritter | |
| 2012/0111003 A1* | 5/2012 | Kasuya | F01K 13/02 |
| | | | 60/618 |
| 2012/0192560 A1 | 8/2012 | Ernst et al. | |
| 2013/0186087 A1* | 7/2013 | Gibble | F01K 7/40 |
| | | | 60/615 |
| 2013/0199178 A1* | 8/2013 | Kanou | F01K 7/22 |
| | | | 60/605.2 |
| 2014/0311141 A1 | 10/2014 | Mori et al. | |
| 2015/0308372 A1 | 10/2015 | Gibble | |
| 2016/0076405 A1 | 3/2016 | Hashimoto et al. | |
| 2016/0130981 A1* | 5/2016 | Grelet | F01K 23/065 |
| | | | 60/616 |
| 2016/0252310 A1* | 9/2016 | Butzke | F28F 13/06 |
| | | | 165/100 |

FOREIGN PATENT DOCUMENTS

| | | |
|---|---|---|
| JP | 2012/007500 A | 1/2012 |
| JP | 2013/076397 A | 4/2013 |
| JP | 2013/181394 A | 9/2013 |
| JP | 5618009 | 9/2014 |
| KR | 10-2005-0001716 | 1/2005 |
| WO | 2015/008107 A | 1/2015 |

OTHER PUBLICATIONS

Office Action issued in corresponding Chinese Application No. 201510895597.5 dated Jul. 2, 2019, with English translation.

\* cited by examiner

WASTE HEAT RECOVERY SYSTEM

CROSS-REFERENCE TO RELATED APPLICATION

This application is a divisional application of non-provisional U.S. patent application Ser. No. 14/954,340, filed on Nov. 30, 2015, which claims priority to and the benefit of Korean Patent Application No. 10-2015-0099299, filed on Jul. 13, 2015 the entirety of each of which are hereby incorporated by reference.

FIELD

The present disclosure relates to a waste heat recovery system.

BACKGROUND

The statements in this section merely provide background information related to the present disclosure and may not constitute prior art.

An engine is widely used for vehicles, ships, small generators, and the like, and attempts to increase efficiency of the engine have been made. The engine generally discharges a large quantity of heat as waste heat, and a waste heat recovery system for recovering the waste heat as energy to increase overall efficiency of the engine has been already developed.

The above-mentioned waste heat recovery system is configured to recover the waste heat of the engine as energy, convert the recovered energy into electrical energy or mechanical energy, and use the electrical energy or the mechanical energy in the engine of the vehicle, other electrical accessories, or the like.

As a representative technology of implementing the above-mentioned waste heat recovery system, there is a Rankine cycle waste heat recovery system recovering the waste heat of the engine as the energy using a Rankine cycle. The Rankine cycle includes a circulation path in which working fluid is circulated, and the circulation path of the Rankine cycle has a boiler (an evaporator) heating and evaporating the working fluid by the waste heat (heat of exhaust gas and/or heat of Exhaust Gas Recirculation (EGR) gas) of the engine, an expander expanding the working fluid supplied from the boiler to generate rotation power, a condenser condensing the working fluid discharged from the expander, and a pump circulating the working fluid in the circulation path.

The boiler is a heat source of a waste heat recovery of the engine, and examples of the boiler include an exhaust gas boiler using exhaust gas and an exhaust gas recirculation (EGR) gas boiler using EGR gas.

Here, the EGR gas has small heat flux while having a high temperature (about 300 to 400° C.), and the exhaust gas has a relatively low temperature (about 200 to 300° C.) while having high heat flux. Besides, a charge air cooler (CAC), an engine coolant, or the like has high heat flux, but has a very low temperature (about 100° C. or less), which is not suitable for the heat source.

The waste heat recovery system according to the related art is classified into 1) a structure using only the exhaust gas boiler as the heat source, 2) a structure using only the EGR gas boiler as the heat source, 3) a structure (a series connection structure) using the exhaust gas boiler and the EGR gas boiler which are connected in series with each other as the heat source, 4) a structure (parallel connection structure) using the exhaust gas boiler and the EGR gas boiler which are connected in parallel to each other as the heat source, and the like.

Among these, in the structure in which the exhaust gas boiler and the EGR gas boiler are connected in parallel to each other, waste heat recovery efficiency is relatively high. However, since this result may be varied depending on an EGR rate, it is difficult to generalize the waste heat recovery efficiency.

Particularly, a deviation of the waste heat recovery efficiency may become severe according to revolutions per minute (RPM) of the engine, a load condition, a post-processing technique (e.g., selective catalyst reduction (SCR), diesel particulate filter (DPF)), and the like. For example, the engine in which the EGR rate of a high load region is tuned to be low may also exhibit higher waste heat recovery efficiency in the series connection structure (a structure in which the EGR gas boiler and the exhaust gas boiler are connected in series with each other so that the working fluid passes through the EGR gas boiler and then passes through the exhaust gas boiler) rather than the parallel connection structure (a structure in which the exhaust gas boiler and the EGR gas boiler are connected in parallel to each other).

As such, in the waste heat recovery system according to the related art, an arrangement structure of the boilers, which are the heat sources, is made as a fixed structure. Therefore, we have discovered that since the heat sources may not be actively varied according to driving conditions, other external factors, and the like, there was a disadvantage that the waste heat recovery efficiency may not be efficiently improved.

SUMMARY

The present disclosure provides a waste heat recovery system capable of actively varying heat sources of the waste heat recovery system to be used by varying at least one of an exhaust gas boiler and an exhaust gas recirculation (EGR) gas boiler, which are the heat sources of the waste heat recovery system, thereby improving waste heat recovery efficiency.

According to one form of the present disclosure, a waste heat recovery system having a Rankine cycle in which a boiler, an expander, a condenser, and a circulation pump are installed on a circulation path in which working fluid is circulated includes: a plurality of boilers configured to be connected to the circulation path of the Rankine cycle through connection pipes between the expander and the circulation pump; and first and second direction control valves configured to be installed at the top and at the bottom of the plurality of boilers to shift flow directions of the working fluid to the plurality of boilers.

The plurality of boilers may include: a first boiler connected to the circulation path of the Rankine cycle through a first connection pipe; and a second boiler connected to the circulation path of the Rankine cycle through a second connection pipe, and the first and second connection pipes may be connected in parallel to the circulation path of the Rankine cycle.

The first connection pipe may have a first inflow pipe connected to an inlet side of the first boiler and a first outflow pipe connected to an outlet side of the first boiler, and the second connection pipe may have a second inflow pipe connected to an inlet side of the second boiler and a second outflow pipe connected to an outlet side of the second boiler.

The first boiler and the second boiler may be connected to each other to directly communicate with each other through a direct connection pipe.

The direct connection pipe may be installed with an opening and closing valve.

The first direction control valve may have an inlet port connected to the circulation pump, a first outlet port connected to the first inflow pipe, and a second outlet port connected to the second inflow pipe.

The first direction control valve may have a first position allowing the inlet port to be communicated with the first outlet port while allowing the inlet port to be communicated with the second outlet port, a second position allowing the inlet port to be communicated with the first outlet port while blocking the inlet port and the second outlet port, and a third position allowing the inlet port to be communicated with the second outlet port while blocking the inlet port and the first outlet port.

The first direction control valve may include a valve housing in which a valve cavity is formed, and a valve spool installed to be movable in the valve cavity, and the inlet port, and the first and second outlet ports may be communicated with the valve cavity, the inlet port may be formed at a location opposite to the first and second outlet ports, and the valve spool may have a land that selectively opens and closes the first and second outlet ports.

The valve housing may further include a pair of stoppers that regulate a movement of the land of the valve spool, and the pair of stoppers may be formed to be spaced apart from each other between the first and second outlet ports.

An outer peripheral surface of the land of the valve spool may be provided with a sealing member.

The inlet port may be formed at one side of the valve housing, the first and second outlet ports may be formed at the other side of the valve housing, and the inlet port may be formed at a location opposite to the first and second outlet ports.

The second direction control valve may have an outlet port connected to the expander, a first inlet port connected to the second outflow pipe, and a second inlet port connected to the first outflow pipe.

The second direction control valve may have a first position allowing the outlet port to be communicated with the first inlet port while allowing the outlet port to be communicated with the second inlet port, a second position allowing the outlet port to be communicated with the first inlet port while blocking the outlet port and the second inlet port, and a third position allowing the outlet port to be communicated with the second inlet port while blocking the outlet port and the first inlet port.

The second direction control valve may include a valve housing in which a valve cavity is formed, and a valve spool installed to be movable in the valve cavity, and the outlet port, and the first and second inlet ports may be communicated with the valve cavity, the outlet port may be famed at a location opposite to the first and second inlet ports, and the valve spool may have a land that selectively opens and closes the first and second inlet ports.

The valve housing may further include a pair of stoppers that regulate a movement of the land of the valve spool, and the pair of stoppers may be formed to be spaced apart from each other between the first and second inlet ports.

An outer peripheral surface of the land of the valve spool may be provided with a sealing member.

The outlet port may be formed at one side of the valve housing, the first and second inlet ports may be formed at the other side of the valve housing, and the outlet port may be formed at a location opposite to the first and second inlet ports.

According to another form of the present disclosure, a waste heat recovery system having a Rankine cycle in which a plurality of boilers, an expander, a condenser, and a circulation pump are installed on a circulation path in which working fluid is circulated, and the plurality of boilers are connected in series with and in parallel to the circulation path includes: first and second direction control valves configured to be installed at the top and at the bottom of the plurality of boilers to shift flow directions of the working fluid to the plurality of boilers; and a controlling unit configured to receive information of a vehicle and information of the waste heat recovery system to control the first and second direction control valves.

The controlling unit may be connected with a first receiving unit receiving the information of the vehicle and a second receiving unit receiving the information of the waste heat recovery system.

The controlling unit may be connected with a control map generated by performing datafication for control conditions of the first and second direction control valves using the information of the vehicle received by the first receiving unit.

According to another form of the present disclosure, a method for driving a waste heat recovery system having a Rankine cycle, a plurality of boilers connected in series with and in parallel to a circulation path of the Rankine cycle, and first and second direction control valves shifting flow directions of working fluid to the plurality of boilers includes: acquiring information of a vehicle and information of the waste heat recovery system; and when it is determined that the plurality of boilers correspond to a variable driving condition on the basis of the acquired information, controlling the first and second direction control valves.

The acquiring of the information of vehicle and the information of the waste heat recovery system may include: acquiring the information of the vehicle; calculating a control map of the first and second direction control valves using the acquired information of the vehicle; and acquiring the information of the waste heat recovery system after the calculating of the control map.

After the controlling of the first and second direction control valves, when a control time elapses a set time, a control operation may end.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings herein are for illustration purposes only and are not intended to limit the scope of the present disclosure in any way.

DETAILED DESCRIPTION

The following description is merely exemplary in nature and is not indented to limit the present disclosure, application or uses. It should be understood that throughout the drawings, corresponding reference numerals indicate like or corresponding parts and features.

For reference, sizes of components, thicknesses of lines, and the like which are shown in the drawings referenced for describing the present disclosure may be slightly exaggerated for convenience of understanding. Further, the terminologies used to describe the present disclosure are defined in consideration of the functions in the present disclosure and may be construed in different ways by the intention of users and operators. Therefore, the definition of the terminologies should be construed based on the contents throughout the specification.

Referring to FIGS. 1 to 5, a waste heat recovery system according to the present disclosure includes a Rankine cycle 100.

The Rankine cycle 100 has a circulation path 105 in which working fluid is circulated, and a plurality of boilers (evaporators) 110 and 120, an expander 130, a condenser 140, a storing tank 150, and a circulation pump 160 all of which are installed on the circulation path 105.

The plurality of boilers 110 and 120 are configured to heat and evaporate the working fluid by waste heat of an engine (e.g., heat of exhaust gas and/or heat of an EGR gas) to generate evaporated working fluid.

The expander 130 is configured to expand the working fluid supplied from the evaporators 110 and 120 to generate recovery power.

The condenser 140 is configured to condense the working fluid discharged from the expander 130 to generate liquid working fluid.

The storing tank 150 may be configured to temporarily store the liquid working fluid condensed by the condenser 140 or store the working fluid at the time of collecting the working fluid according to an operation stop of the waste heat recovery system (a stop of a vehicle).

The circulation pump 160 is configured to supply the working fluid to the evaporator 110 from the condenser 140.

Meanwhile, the condenser 140, the storing tank 150, the circulation pump 160, and the like on the circulation path 105 of the Rankine cycle 100 may be sequentially stacked in a vertical direction. That is, the storing tank 150 may be disposed below the condenser 140 and the circulation pump 160 may be disposed below the storing tank 150. Thereby, since the working fluid may be smoothly transferred to the storing tank 150 from the condenser 140 by gravity, circulation efficiency of the working fluid may be improved.

In addition, a non-return valve 180 is installed between the condenser 140 and the storing tank 150, and is configured to prevent the working fluid from flowing backwardly to the condenser 140 from the storing tank 150.

According to a form of the present disclosure, the plurality of boilers 110 and 120 include a first boiler 110 and a second boiler 120 which are connected to the circulation path 105 through first connection pipes 111 and 112 and second connection pipes 121 and 122.

According to one aspect of the present disclosure, the first boiler 110 may be configured of an exhaust gas boiler disposed on an exhaust pipe of the engine to perform a heat exchange between exhaust gas and the working fluid, and the second boiler 120 may be configured of an EGR gas boiler provided on an EGR path of the engine to perform the heat exchange between EGR gas and the working fluid.

Meanwhile, in the case in which the first boiler 110 is the exhaust gas boiler and the second boiler 120 is the EGR gas boiler, the first boiler 110 may be disposed below the second boiler 120.

The first boiler 110 is connected to the circulation path 105 of the Rankine cycle 100 through the first connection pipes 111 and 112, and the second boiler 120 is connected to the circulation path 105 of the Rankine cycle 100 through the second connection pipes 121 and 122.

The first connection pipes 111 and 112 have a first inflow pipe 111 connected to an inlet 110a of the first boiler 110, and a first outflow pipe 112 connected to an outlet 110b of the first boiler 110.

The second connection pipes 121 and 122 have a second inflow pipe 121 connected to an inlet 120a of the second boiler 120, and a second outflow pipe 122 connected to an outlet 120b of the second boiler 120.

Meanwhile, the first connection pipes 111 and 112 and the second connection pipes 121 and 122 are connected in parallel to the circulation path 105 of the Rankine cycle 100, such that the first boiler 110 and the second boiler 120 are connected in parallel to each other between the expander 130 and the circulation pump 160. That is, the first boiler 110 and the second boiler 120 may be connected in parallel to each other through the first connection pipes 111 and 112 and the second connection pipes 121 and 122.

In addition, the first boiler 110 and the second boiler 120 are connected to each other to be directly communicated with each other through a direct connection pipe 170. That is, the first boiler 110 and the second boiler 120 may be connected in series with the circulation path 105 through the direct connection pipe 170.

One end of the direct connection pipe 170 is connected to a communication hole 110c of the first boiler 110, and the other end of the direct connection pipe 170 is connected to a communication hole 120c of the second boiler 120. The first boiler 110 and the second boiler 120 may be directly communicated with each other through the direct connection pipe 170. In addition, the direct connection pipe 170 may be installed with an opening and closing valve 175 of on/off type blocking or opening a flow channel thereof, and the first boiler 110 and the second boiler 120 may be directly communicated with each other or may be blocked from each other by an on/off operation of the opening and closing valve 175.

A first direction control valve 10 is installed at the top of the plurality of boilers 110 and 120, and a second direction control valve 20 is installed at the bottom of the plurality of boilers 110 and 120.

The first and second direction control valves 10 and 20 are configured to shift a flow direction of the working fluid to the boilers 110 and 120.

The first direction control valve 10 has an inlet port 15 connected to the circulation pump 160, a first outlet port 16 connected to the first inflow pipe 111, and a second outlet port 17 connected to the second inflow pipe 121.

In addition, the first direction control valve 10 has a first position 11 allowing the inlet port 15 to be simultaneously communicated with the first outlet port 16 and the second outlet port 17, a second position 12 allowing the inlet port 15 to be communicated with the first outlet port 16, and a third position 13 allowing the inlet port 15 to be communicated with the second outlet port 17, as illustrated in FIGS. 1 to 5.

Figure 1:
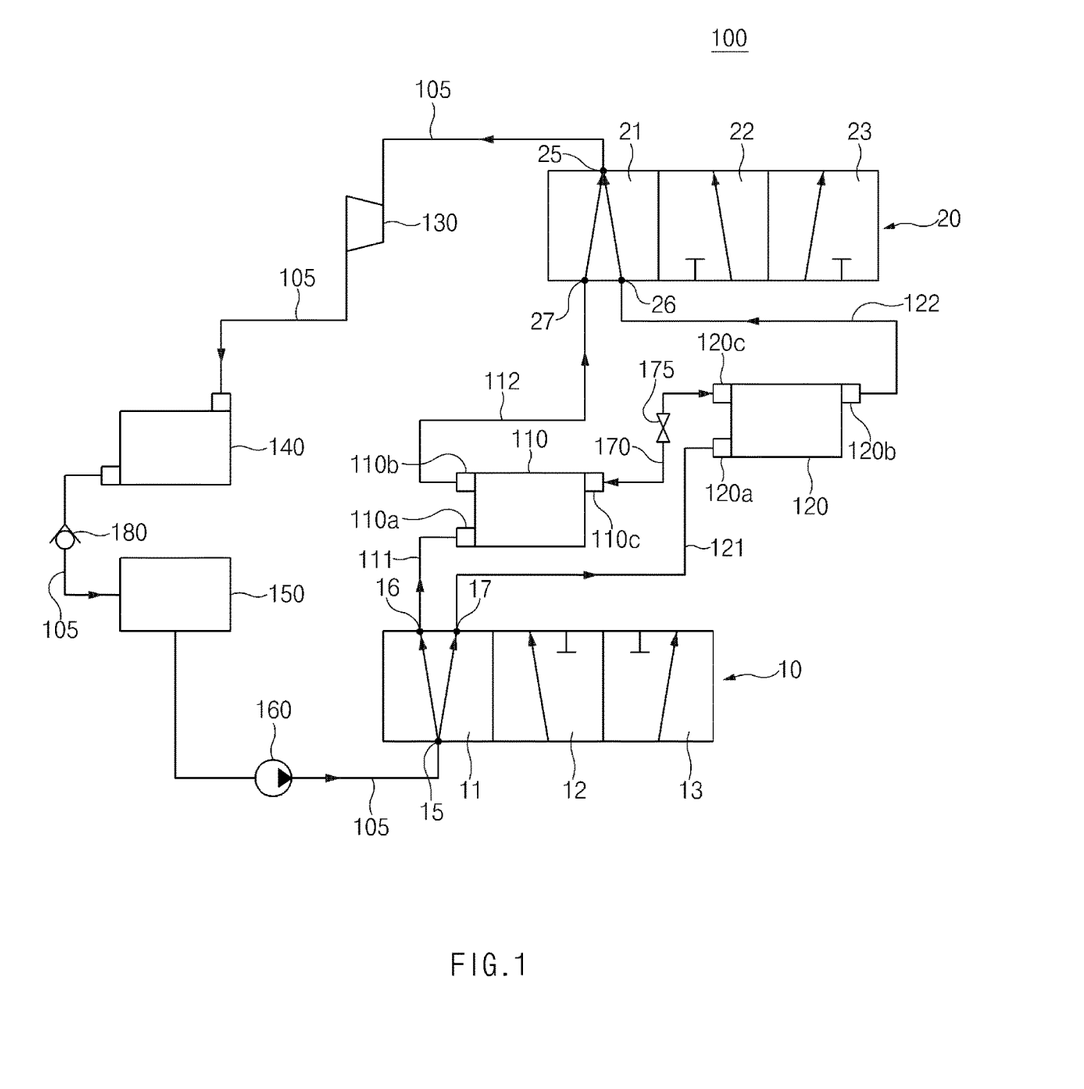
FIG. 1 is a diagram illustrating a waste heat recovery system according to an exemplary form of the present disclosure and illustrates a parallel driving mode in which working fluid passes through first and second boilers in parallel.

When the first direction control valve 10 is shifted to the first position 11, all of the inlet port 15, the first outlet port 16, and the second outlet port 17 are opened as illustrated in FIG. 1. Thereby, an internal flow channel is formed so that the inlet port 15 is simultaneously communicated with the first outlet port 16 and the second outlet port 17.

Figure 2:
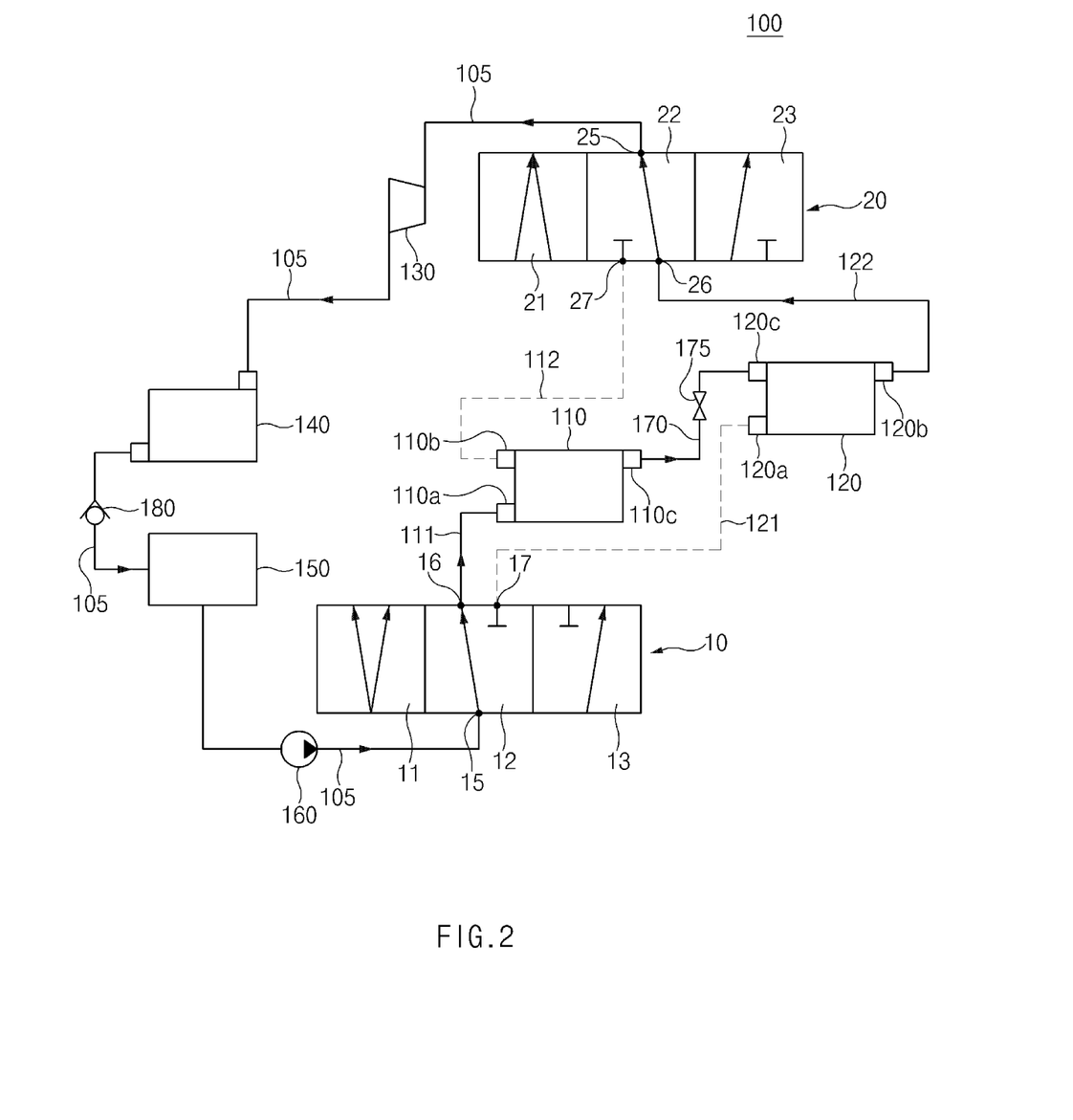
FIG. 2 is a diagram illustrating the waste heat recovery system according to an exemplary form of the present disclosure and illustrates a first series driving mode in which the working fluid passes through the first boiler and then passes through the second boiler in series.
Figure 4:
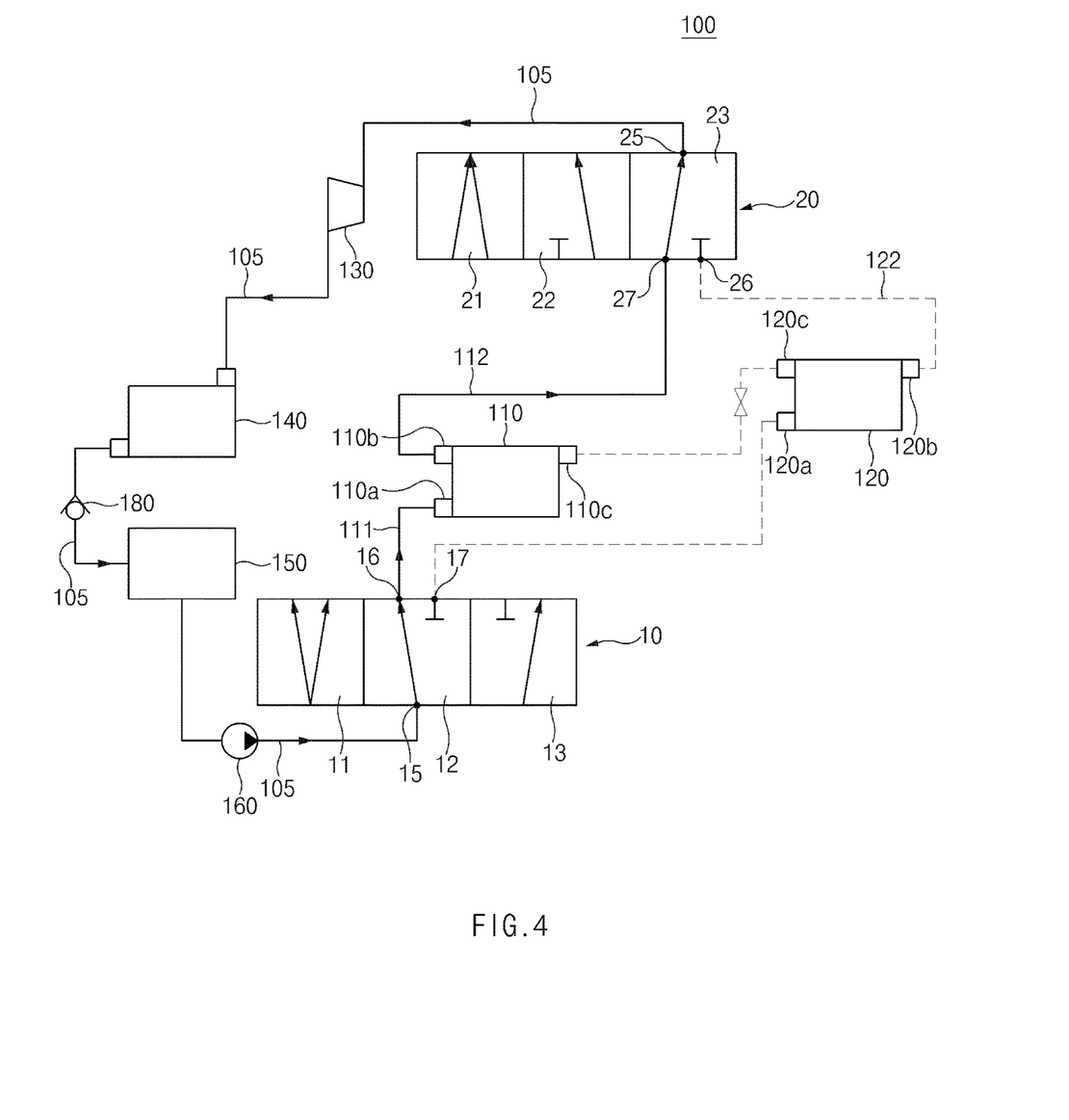
FIG. 4 is a diagram illustrating a waste heat recovery system according to another exemplary form of the present disclosure and illustrates a first nonparalleled mode in which working fluid passes through only a first boiler.

When the first direction control valve 10 is shifted to the second position 12, the inlet port 15 and the first outlet port 16 are opened at the same time while the second outlet port 17 is closed as illustrated in FIGS. 2 and 4. Thereby, an internal flow channel is formed so that the inlet port 15 is communicated with the first outlet port 16 at the same time while the inlet port 15 is blocked against the second outlet port 17.

Figure 3:
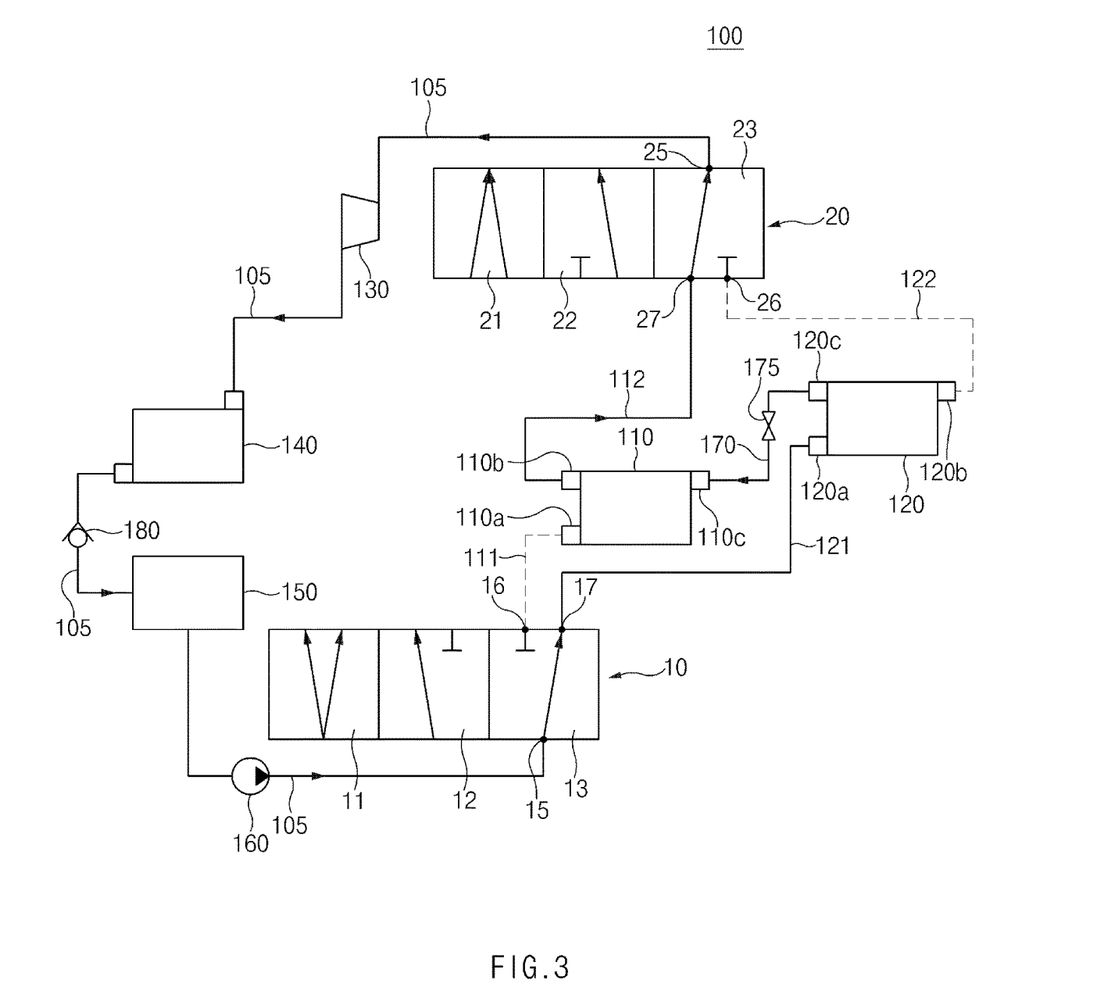
FIG. 3 is a diagram illustrating the waste heat recovery system according to an exemplary form of the present disclosure and illustrates a second series driving mode in which the working fluid passes through the second boiler and then passes through the first boiler in series.
Figure 5:
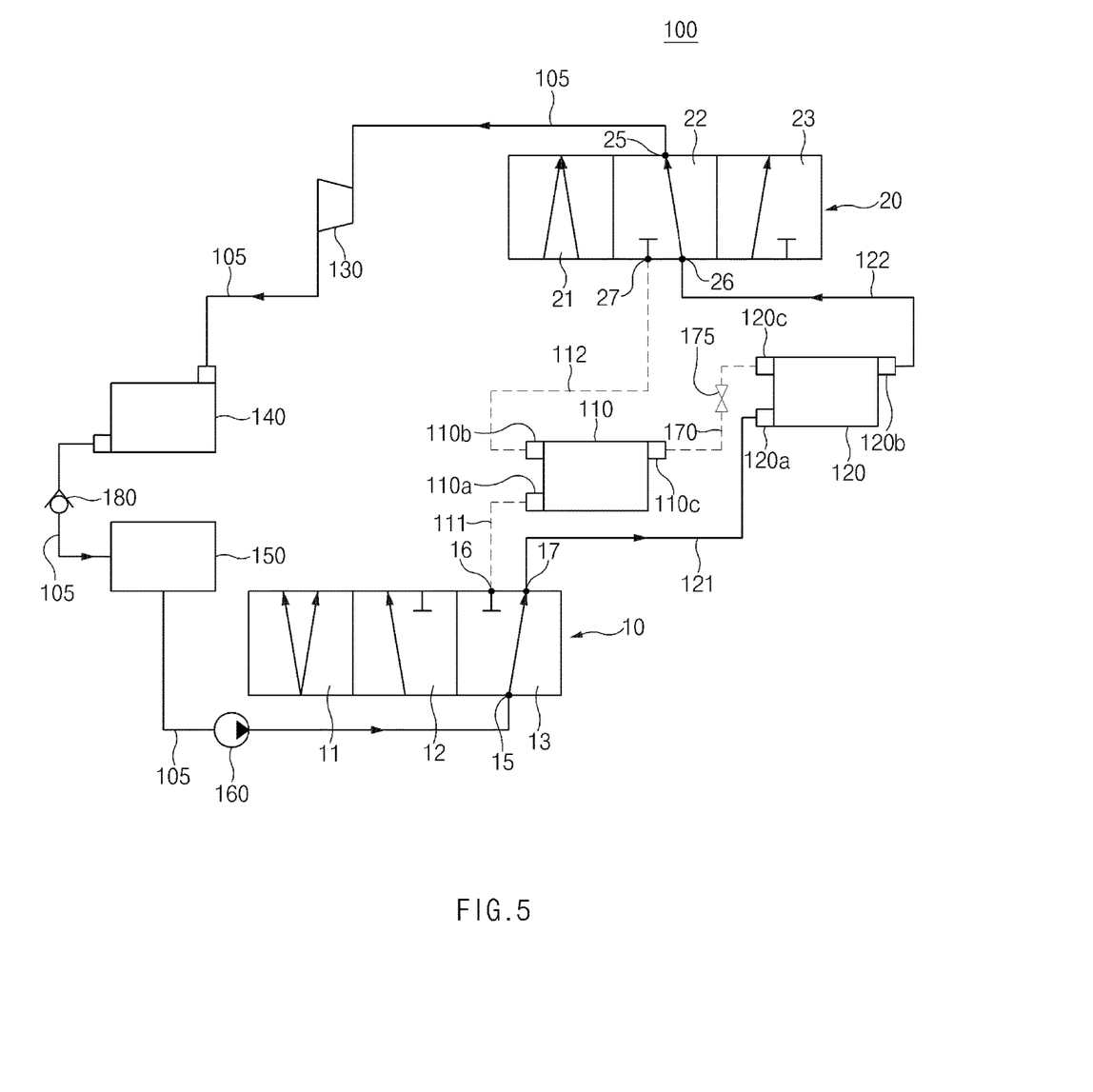
FIG. 5 is a diagram illustrating the waste heat recovery system according to another exemplary form of the present disclosure and illustrates a second nonparalleled mode in which the working fluid passes through only a second boiler.

When the first direction control valve 10 is shifted to the third position 13, the inlet port 15 and the second outlet port 17 are opened at the same time while the first outlet port 16 is closed as illustrated in FIGS. 3 and 5. Thereby, an internal flow channel is formed so that the inlet port 15 is communicated with the second outlet port 17 at the same time while the inlet port 15 is blocked against the first outlet port 16.

Figure 6:
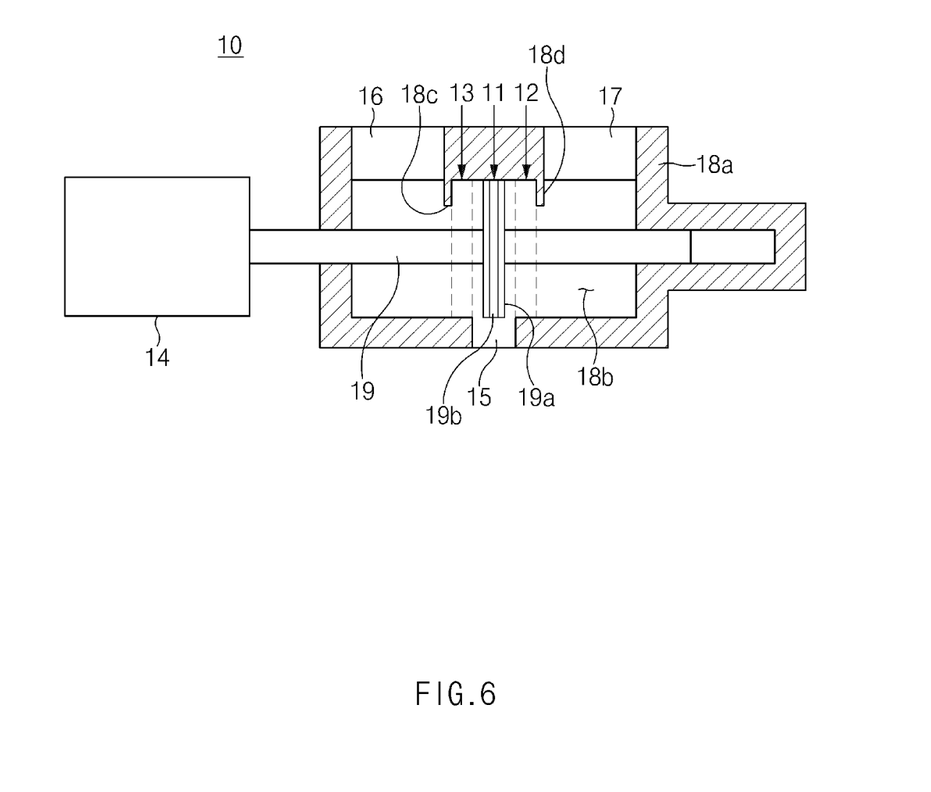
FIG. 6 is a cross-sectional view illustrating a first direction control valve of the waste heat recovery system according to an exemplary form of the present disclosure.

A specific exemplary form of the first direction control valve 10 is illustrated in FIG. 6. Referring to FIG. 6, the first direction control valve 10 includes a valve housing 18a in which a valve cavity 18b is formed, a valve spool 19 installed to be movable in the valve cavity 18b, and an actuator 14 driving the valve spool 19.

The valve housing 18a is provided with an inlet port 15, a first outlet port 16, and a second outlet port 17, and the inlet port 15, the first outlet port 16, and the second outlet port 17 are formed to be communicated with the valve cavity 18b.

Particularly, the inlet port 15 is formed at a location opposite to the first and second outlet ports 16 and 17, the first outlet port 16 and the second outlet port 17 are formed on the same surface as that of the valve housing 18a, and the first outlet port 16 and the second outlet port 17 are disposed to be spaced apart from each other by a predetermined interval.

The valve spool 19 has a land 19a that selectively opens and closes the first and second outlet ports 16 and 17, and the land 19a is formed in a structure extended in a radial direction of the valve spool 19 from an outer peripheral surface of one side of the valve spool 19.

The actuator 14, which is a configuration for moving the valve spool 19 in a straight line direction in the valve cavity 18b, may be formed in a structure in which a solenoid and a spring are combined, a structure in which a driving motor and a power tool are combined, or the like.

In addition, a pair of stoppers 18c and 18d for regulating a movement of the valve spool 19 are formed in the valve housing 18a. Particularly, a first stopper 18c is formed to be adjacent to the first outlet port 16 and the second stopper 18d is formed to be adjacent to the second outlet port 17, such that the first stopper 18c and the second stopper 18d are spaced apart from each other so as to correspond to the spaced interval between the first outlet port 16 and the second outlet port 17. Thereby, as the land 19a is caught with the first and second stoppers 18c and 18d at the time of moving the valve spool 19, a movement range of the land 19a of the valve spool 19 may be regulated to correspond to a distance between the pair of stoppers 18c and 18d.

As such, the movement range of the land 19a of the valve spool 19 is regulated by the first and second stoppers 18c and 18d at the same time while a width of the land 19a is formed to be smaller than a diameter of the inlet port 15, such that the inlet port 15 is configured to be always opened regardless of a position shift of the valve spool 19.

In addition, a sealing member 19b is provided on an outer peripheral surface of the land 19a of the valve spool 19 to be extended along a circumferential direction of the land 19a. Thereby, when the first outlet port 16 and the second outlet port 17 are selectively closed by the valve spool 19, airtight property of the first outlet port 16 and the second outlet port 17 may be sufficiently secured.

The position shift of the first direction control valve 10 according to the movement of the valve spool 19 will be described in detail.

In FIG. 6, if the valve spool 19 is disposed at a central portion of the inlet port 15 (see an arrow 11), the inlet port 15 is communicated with both the first and second outlet ports 16 and 17, such that the first direction control valve 10 is shifted to the first position 11 of FIG. 1.

In FIG. 6, if the valve spool 19 is disposed to be adjacent to the second outlet port 17 (see an arrow 12 of FIG. 6), the inlet port 15 is communicated with the first outlet port 16 and the second outlet port 17 is blocked, such that the first direction control valve 10 is shifted to the second position 12 of FIGS. 2 and 4.

In FIG. 6, if the valve spool 19 is disposed to be adjacent to the first outlet port 16 (see an arrow 13 of FIG. 6), the inlet port 15 is communicated with the second outlet port 17 and the first outlet port 16 is blocked, such that the first direction control valve 10 is shifted to the third position 13 of FIGS. 3 and 5.

The second direction control valve 20 has an outlet port 25 connected to the expander 130, a first inlet port 26 connected to the second outflow pipe 122, and a second inlet port 27 connected to the first outflow pipe 112.

In addition, the second direction control valve 20 has a first position 21 allowing the outlet port 25 to be simultaneously communicated with the first inlet port 26 and the second inlet port 27, a second position 22 allowing the outlet port 25 to be communicated with the first inlet port 26, and a third position 23 allowing the outlet port 25 to be communicated with the second inlet port 27, as illustrated in FIGS. 1 to 5.

When the second direction control valve 20 is shifted to the first position 21, all of the outlet port 25, the first inlet port 26, and the second inlet port 27 are opened as illustrated in FIG. 1. Thereby, an internal flow channel is formed so that the outlet port 25 is simultaneously communicated with the first inlet port 26 and the second inlet port 27.

When the second direction control valve 20 is shifted to the second position 22, the outlet port 25 and the first inlet port 26 are opened at the same time while the second inlet port 27 is closed as illustrated in FIGS. 2 and 5. Thereby, an internal flow channel is formed so that the outlet port 25 is communicated with the first inlet port 26 at the same time while the outlet port 25 is blocked against the second inlet port 27.

When the second direction control valve 20 is shifted to the third position 23, the outlet port 25 and the second inlet port 27 are opened at the same time while the first inlet port 26 is closed as illustrated in FIGS. 3 and 4. Thereby, an internal flow channel is famed so that the outlet port 25 is communicated with the second inlet port 27 at the same time while the outlet port 25 is blocked against the first inlet port 26.

Figure 7:
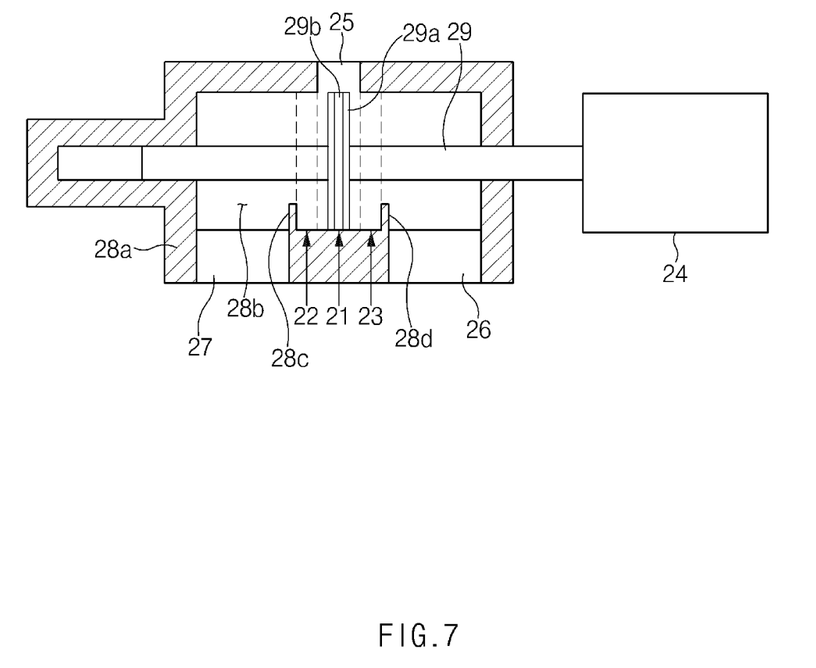
FIG. 7 is a cross-sectional view illustrating a second direction control valve of the waste heat recovery system according to an exemplary form of the present disclosure.

A specific exemplary embodiment of the second direction control valve 20 is illustrated in FIG. 7. Referring to FIG. 7, the second direction control valve 20 includes a valve housing 28a in which a valve cavity 28b is formed, a valve spool 29 installed to be movable in the valve cavity 28b, and an actuator 24 driving the valve spool 29.

The valve housing 28a is provided with an outlet port 25, a first inlet port 26, and a second inlet port 27, and the outlet port 25, the first inlet port 26, and the second inlet port 27 are formed to be communicated with the valve cavity 28b.

Particularly, the outlet port 25 is formed at a location opposite to the first and second inlet ports 26 and 27, the first inlet port 26 and the second inlet port 27 are formed on the same location of the valve housing 28a, and the first inlet port 26 and the second inlet port 27 are disposed to be spaced apart from each other by a predetermined interval.

The valve spool 29 has a land 29a that selectively opens and closes the first and second inlet ports 26 and 27, and the land 29a is famed in a structure extended in a radial direction of the valve spool 29 from an outer peripheral surface of one side of the valve spool 29.

The actuator 24, which is a configuration for moving the valve spool 29 in a straight line direction in the valve cavity 28b, may be formed in a structure in which a solenoid and a spring are combined, a structure in which a driving motor and a power tool are combined, or the like.

In addition, a pair of stoppers 28c and 28d for regulating a movement of the valve spool 29 are formed in the valve housing 28a. Particularly, a first stopper 28c is formed to be adjacent to the first inlet port 26 and the second stopper 28d is formed to be adjacent to the second inlet port 27, such that the first stopper 28c and the second stopper 28d are spaced apart from each other so as to correspond to the spaced interval between the first inlet port 26 and the second inlet port 27. Thereby, as the land 29a is caught with the first and second stoppers 28c and 28d at the time of moving the valve spool 29, a movement of the land 29a of the valve spool 29 may be regulated.

As such, the movement range of the land 29a of the valve spool 29 is regulated by the first and second stoppers 28c and 28d at the same time while a width of the land 29a is formed to be smaller than a diameter of the outlet port 25, such that the outlet port 25 is configured to be always opened regardless of a position shift of the valve spool 29.

In addition, a sealing member 29b is provided on an outer peripheral surface of the land 29a of the valve spool 29 to be extended along a circumferential direction of the land 29a. Thereby, when the valve spool 29 selectively closes any one of the first inlet port 26 and the second inlet port 27, airtight property of the first inlet port 26 and the second inlet port 27 may be sufficiently secured.

The movement of the valve spool 29 and the position shift accordingly will be described in more detail.

In FIG. 7, if the valve spool 29 is disposed at a central portion of the outlet port 25 (see an arrow 21), the outlet port 25 is communicated with both the first and second inlet ports 26 and 27, such that the second direction control valve 20 is shifted to the first position 21 of FIG. 1.

In addition, in FIG. 7, if the valve spool 29 is disposed to be adjacent to the second inlet port 27 (see an arrow 22 of FIG. 7), the outlet port 25 is communicated with the first inlet port 26 and is blocked against the second inlet port 27, such that the second direction control valve 20 is shifted to the second position 22 of FIGS. 2 and 5.

In addition, in FIG. 7, if the valve spool 29 is disposed to be adjacent to the first inlet port 26 (see an arrow 23 of FIG. 7), the outlet port 25 is communicated with the second inlet port 27 and is blocked against the first inlet port 26, such that the second direction control valve 20 is shifted to the third position 23 of FIGS. 3 and 4.

Figure 8:
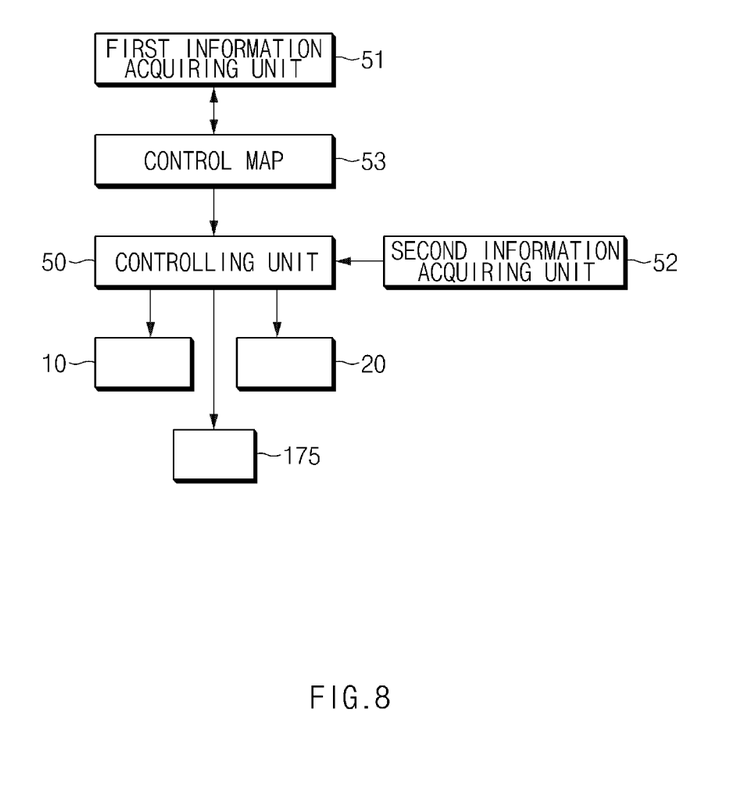
FIG. 8 is a block diagram illustrating a connection relationship among a controlling unit, first and second information acquiring units, and a control map of the waste heat recovery system according to an exemplary form of the present disclosure.

In addition, the waste heat recovery system according to the present disclosure includes a controlling unit 50 configured to control operations of the first and second direction control valves 10 and 20, and the opening and closing valve 175, and the controlling unit 50 has a first information acquiring unit 51 acquiring information of a vehicle and a second information acquiring unit 52 acquiring information of the waste heat recovery system.

The first information acquiring unit 51 is connected to an electronic control unit (ECU: not illustrated) of the vehicle. Thereby, the first information acquiring unit 51 is configured to acquire a variety of information of the vehicle such as RPM of the engine, a load of the engine, an EGR rate, thermal capacity of exhaust gas, thermal capacity of EGR gas, and the like.

The first information acquiring unit 51 is connected to a control map 53, and the control map 53 is generated by calculating (performing datafication for) control conditions of the first and second direction control valves 10 and 20, and the like, using the information of the vehicle acquired by the first information acquiring unit 51.

The second information acquiring unit 52 is connected to a variety of sensors (not illustrated) installed in the boilers 110 and 120, the expander 130, and the like of the waste heat recovery system. Thereby, the second information acquiring unit 52 is configured to acquire information of the waste heat recovery system such as temperatures and pressures of the inlets and outlets of the respective boilers 110 and 120, RPM of the expander 130, and the like.

The controlling unit 50 may control the first and second direction control valves 10 and 20 using the control map 53 according to the information of the waste heat recovery system acquired by the second information acquiring unit 52.

Hereinafter, a variable driving process of the boilers of the waste heat recovery system according to the present disclosure will be described in detail, on the assumption that the first boiler 110 is the exhaust gas boiler and the second boiler 120 is the EGR gas boiler.

<Parallel Driving Mode>

In the case in which the vehicle is driven at a constant speed for a long time in a state in which a temperature of EGR gas and a temperature of exhaust gas are similar to each other, and the waste heat recovery system is maintained in a normal state, the working fluid passes through the first boiler 110 and the second boiler 120 in parallel as in FIG. 1, thereby making it possible to increase waste heat recovery rate.

The parallel driving mode will be described in more detail with reference to FIG. 1. As the first direction control valve 10 is shifted to the first position 11 and the second direction control valve 20 is shifted to the first position 21, the working fluid is transferred to the first boiler 110 and the second boiler 120 through the first inflow pipe 111 and the second inflow pipe 121 to be heat-exchanged in the first boiler 110 and the second boiler 120, respectively, and is then transferred to the expander 130 through the first outflow pipe 112 and the second outflow pipe 122.

Here, the valve spool 19 of the first direction control valve 10 is linearly controlled to finely adjust a location of the land 19a (see FIG. 6), thereby making it possible to appropriately control a flow rate of the working fluid supplied to the first boiler 110 and the second boiler 120. In addition, the working fluid may also be moved between the first boiler 110 and the second boiler 120 through the direct connection pipe 170.

<First Series Driving Mode>

In a driving condition of a low load and low RPM, since the EGR rate is high, the temperature of the EGR gas is high, and the temperature of the exhaust gas is relatively low.

As described above, in the condition in which the temperature of the EGR gas is higher than the temperature of the exhaust gas, the working fluid passes through the first boiler 110, which is the exhaust gas boiler, and then passes through the second boiler 120, which is the EGR gas boiler, as in FIG. 2, thereby making it possible to increase the waste heat recovery rate. For example, in the condition in which the temperature of the EGR gas is higher than the temperature of the exhaust gas, the working fluid is primarily heat-exchanged with the exhaust gas and is then secondarily heat-exchanged with the EGR gas to increase heat exchange efficiency of the working fluid, thereby making it possible to increase the waste heat recovery rate.

The first series driving mode will be described in more detail with reference to FIG. 2. As the first direction control valve 10 is shifted to the second position 12 and the second direction control valve 20 is shifted to the second position 22, the working fluid is introduced into the first boiler 110 through the first inflow pipe 111 to be primarily heat-exchanged with the exhaust gas in the first boiler 110. Thereafter, the working fluid is introduced into the second boiler 120 through the direct connection pipe 170 to be secondarily heat-exchanged with the EGR gas in the second boiler 120 and is then transferred to the expander 130 through the second outflow pipe 122.

In this case, flow channels of the first outflow pipe 112 and the second inflow pipe 121 are closed (see a dotted line of FIG. 2).

<Second Series Driving Mode>

In the case of an engine in which the EGR rate is set to be low or an engine in which a selectively catalyst reduction (SCR) is mounted, in the driving condition of the high load and high RPM, the temperature of the EGR gas is relatively low and the temperature of the exhaust gas is relatively high in a driving state of the high load and high RPM.

As described above, in the condition in which the temperature of the exhaust gas is higher than the temperature of the EGR gas, the working fluid passes through the second boiler 120, which is the EGR gas boiler, and then passes through the first boiler 110, which is the exhaust gas boiler, as in FIG. 3, thereby making it possible to increase the waste heat recovery rate. For example, in the condition in which the temperature of the exhaust gas is higher than the temperature of the EGR gas, the working fluid is primarily heat-exchanged with the EGR gas and is then secondarily heat-exchanged with the exhaust gas to increase heat exchange efficiency of the working fluid, thereby making it possible to increase the waste heat recovery rate.

The second series driving mode will be described in more detail with reference to FIG. 3. As the first direction control valve 10 is shifted to the third position 13 and the second direction control valve 20 is shifted to the third position 23, the working fluid is introduced into the second boiler 120 through the second inflow pipe 121 to be primarily heat-exchanged with the EGR gas in the second boiler 120. Thereafter, the working fluid is introduced into the first boiler 110 through the direct connection pipe 170 to be secondarily heat-exchanged with the exhaust gas in the first boiler 110 and is then transferred to the expander 130 through the first outflow pipe 112.

In this case, flow channels of the first inflow pipe 111 and the second outflow pipe 122 are closed (see a dotted line of FIG. 3).

<First Nonparalleled Mode>

In the case in which the EGR rate is 0 or in the case in which heat recovered by the heat exchange with the EGR gas is insignificant such as a diesel particulate filter (DPF) regeneration condition, or the like, it is advantageous in terms of heat loss to block the second boiler 120, which is the EGR gas boiler, and to pass the working fluid through only the first boiler 110, which is the exhaust gas boiler. The reason is that heat recovered in the case in which the working fluid passes through the second boiler 120 is insignificant while larger heat loss occurs when the working fluid passes through the second boiler 120, the second inflow pipe 121, and the second outflow pipe 122.

Thereby, in the condition in which the EGR rate is very low, the working fluid passes through only the first boiler 110, which is the exhaust gas boiler, thereby making it possible to uniformly maintain the waste heat recovery efficiency.

The first nonparalleled mode will be described in detail with reference to FIG. 4. As the first direction control valve 10 is shifted to the second position 12 and the second direction control valve 20 is shifted to the third position 23, the working fluid is introduced into the first boiler 110 through the first inflow pipe 111 to be heat-exchanged with the exhaust gas in the first boiler 110 and is then transferred to the expander 130 through the first outflow pipe 112.

In this case, flow channels of the second inflow pipe 121, the second outflow pipe 122, and the direct connection pipe 170 are closed (see a dotted line of FIG. 4).

<Second Nonparalleled Mode>

In the condition in which temperatures of a muffler, an exhaust pipe, and the like configuring an exhaust system are low, such as an initial start condition of an engine, or the like, since heat of the working fluid recovered by the heat exchange with the exhaust gas is insignificant, it is advantageous in terms of heat loss to block the first boiler 110, which is the exhaust gas boiler, and to pass the working fluid through only the second boiler 120, which is the EGR gas boiler. The reason is that heat recovered in the case in which the working fluid passes through the first boiler 110 is insignificant while larger heat loss occurs when the working fluid passes through the first boiler 110, the first inflow pipe 111, and the first outflow pipe 112.

Thereby, in the condition in which the temperature of the exhaust system is very low, the working fluid passes through only the second boiler 120, which is the EGR gas boiler, thereby making it possible to uniformly maintain the waste heat recovery efficiency.

The second nonparalleled mode will be described in detail with reference to FIG. 5. As the first direction control valve 10 is shifted to the third position 13 and the second direction control valve 20 is shifted to the second position 22, the working fluid is introduced into the second boiler 120 through the second inflow pipe 121 to be heat-exchanged with the EGR gas in the second boiler 120 and is then transferred to the expander 130 through the second outflow pipe 122.

In this case, flow channels of the first inflow pipe 111, the first outflow pipe 112, and the direct connection pipe 170 are closed (see a dotted line of FIG. 5).

Figure 9:
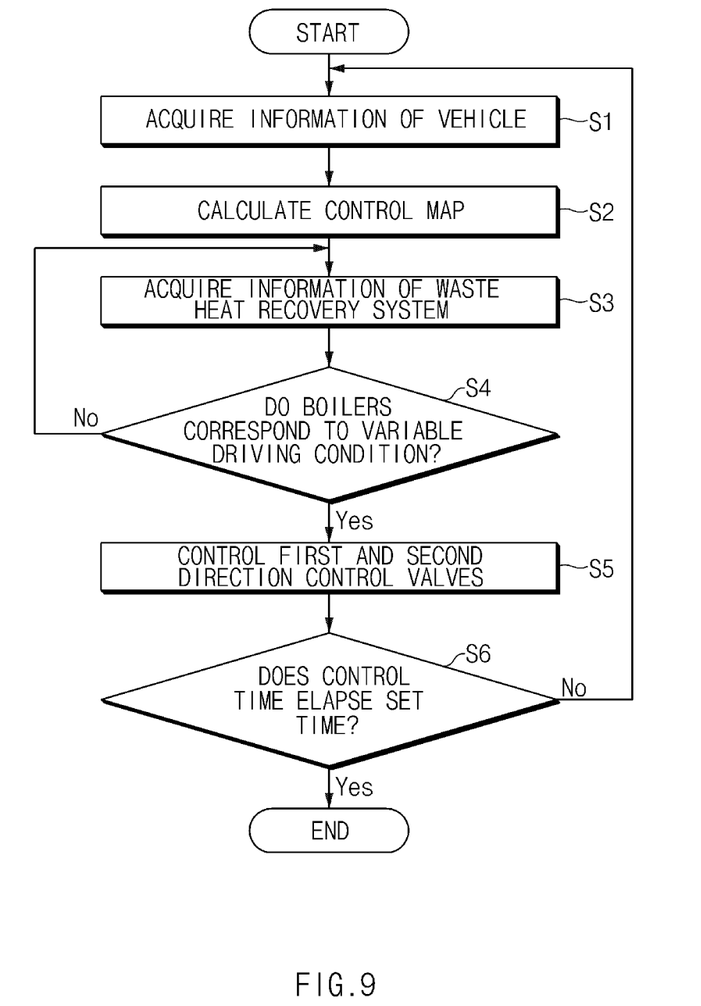
FIG. 9 is a flow chart illustrating a method for driving a waste heat recovery system according to an exemplary form of the present disclosure.

FIG. 9 is a flow chart illustrating a method for driving a waste heat recovery system according to a form of the present disclosure.

As illustrated in FIG. 9, the first information acquiring unit 41 acquires information of a vehicle (RPM and load of an engine, an EGR rate, heat capacity of exhaust gas, heat capacity of EGR gas, and the like) from an ECU (not illustrated) of the vehicle (S1), and the control map 53 obtained by performing datafication for separate control conditions, or the like of the first and second direction control valves 10 and 20 is calculated based on the information of the vehicle acquired by the first information acquiring unit 51 (S2).

Thereafter, the second information acquiring unit 52 acquires information of the waste heat recovery system such as the temperatures and pressures of the respective inlets and outlets of the first and second boilers 110 and 120, RPM of the expander, and the like (S3).

It is determined whether or not the plurality of boilers 110 and 120 correspond to a variable driving condition on the basis of the information of the vehicle and the information of the waste heat recovery system acquired as described above (S4), and if it is determined that the plurality of boilers 110 and 120 correspond to the variable driving condition, the first and second direction control valves 10 and 20 are separately controlled (S5), thereby driving the waste heat recovery system in any one of the parallel driving mode (see FIG. 1), the first series driving mode (see FIG. 2), the second series driving mode (see FIG. 3), the first nonparalleled mode (see FIG. 4), and the second nonparalleled mode (see FIG. 5) described above.

Thereafter, when a control time for the first and second direction control valves 10 and 20 elapses a set time, the corresponding control operation ends (S6).

As described above, according to the forms of the present disclosure, the heat sources of the waste heat recovery system may be actively varied by passing the working fluid through at least one of the exhaust gas boiler and the EGR gas boiler, which are the heat sources of the waste heat recovery system, to perform the heat exchange, thereby making it possible to improve waste heat recovery efficiency.

The description of the disclosure is merely exemplary in nature and, thus, variations that do not depart form the substance of the disclosure are intended to be within the scope of the disclosure. Such variations are not to be regarded as a departure from the spirit and scope of the disclosure.

What is claimed is:

1. A waste heat recovery system having a Rankine cycle in which a plurality of boilers, an expander, a condenser, and a circulation pump are installed on a circulation path in which working fluid is circulated, the waste heat recovery system comprising:
   a first boiler configured to exchange heat between an exhaust gas and the working fluid and be connected to the circulation path of the Rankine cycle through a first connection pipe;
   a second boiler configured to exchange heat between an exhaust gas recirculation (EGR) gas and the working fluid and be connected to the circulation path of the Rankine cycle through a second connection pipe;
   a first and a second direction control valves configured to be installed at a top and at a bottom of the plurality of boilers to shift flow directions of the working fluid to the plurality of boilers; and
   an electronic control unit (ECU) configured to receive information of a vehicle and information of the waste heat recovery system to control the first and second direction control valves,
   wherein:
      the first boiler and the second boiler are connected to each other to be directly communicated with each other through a direct connection pipe, and
      an opening and closing valve is installed at the direct connection pipe and configured to control the working fluid flowing between the first boiler and the second boiler.

2. The waste heat recovery system according to claim 1, wherein the ECU is configured to receive the information of the vehicle and the information of the waste heat recovery system.

3. The waste heat recovery system according to claim 2, wherein the ECU is connected with a control map generated by performing datafication for control conditions of the first and second direction control valves using the received information of the vehicle.

* * * * *